US005341287A

United States Patent [19]

Cordier et al.

[11] Patent Number: 5,341,287

[45] Date of Patent: Aug. 23, 1994

[54] METHOD AND APPARATUS FOR THE CONTROL AND REGULATION OF A FIRST MAGNITUDE OF A DEVICE BY ACTION ON A SECOND MAGNITUDE

[75] Inventors: Joël Cordier, Carrieres sur Seine; Laurent Cariou, Sceaux, both of France

[73] Assignee: Thomson-CSF, Pluteaux, France

[21] Appl. No.: 929,711

[22] Filed: Aug. 12, 1992

[30] Foreign Application Priority Data

Aug. 23, 1991 [FR] France ................................ 91 10569

[51] Int. Cl.[5] ............................................. G05B 13/02

[52] U.S. Cl. .................................... 364/148; 323/318; 323/907; 364/176

[58] Field of Search ........................ 364/148, 152, 176; 323/318, 313, 275, 277, 353, 229, 230, 231, 907; 307/310; 330/143, 256, 289

[56] References Cited

U.S. PATENT DOCUMENTS

| | | | |
|---|---|---|---|
| 3,701,004 | 10/1972 | Tuccinardi et al. | 323/275 |
| 3,909,601 | 9/1975 | Yamawaki et al. | 364/138 X |
| 4,001,554 | 1/1977 | Hall et al. | 364/139 X |
| 4,002,964 | 1/1977 | Gordon | 323/353 |

FOREIGN PATENT DOCUMENTS

| | | |
|---|---|---|
| 0108408 | 5/1984 | European Pat. Off. . |
| 2437656 | 4/1980 | France . |
| 8501134 | 3/1985 | PCT Int'l Appl. . |

*Primary Examiner*—Joseph Ruggiero

*Attorney, Agent, or Firm*—Meltzer, Lippe, Goldstein, Wolf, Schissel & Sazer

[57] ABSTRACT

A device and process for the control of a magnitude x by action on a control magnitude y is disclosed. Magnitude x has a one-to-one relationship with magnitude y when the value of a parameter h remains constant. Magnitude x is sensitive to and a one-to-one function of parameter h. Parameter h varies in a predetermined interval $h_m$ to $h_M$, including reference value $h_i$. A function $y_p = g_p(h)$, which is the value given to the magnitude y to obtain the value $x_p$ when the parameter has a value h, can be defined for each value $x_p$. The different functions $g_p(h)$ have a property wherein the value of a second function $g'_p(h)$ can be determined from the value of function $g_p(h)$ having the same value of parameter h, by the addition of a function of the difference between the real measured value $h_r$ and the reference value $h_i$. Magnitude x is represented by the output magnitude of an operational amplifier having first and second inputs. A control circuit applies to the first input a voltage $U_i$ representing the control magnitude $y_i$ used to obtain the output magnitude with the value $x_i$. A voltage $V_c$, the output magnitude corrected by a correction device of a sensor of the parameter h, is applied to the second input. The output of the sensor is corrected by said correction device. The corrected voltage $V_c$ is substantially equal to 0 when $h = h_i$ and, substantially, equal to $H_{(hr-hi)}$ when $h \neq h_i$.

30 Claims, 6 Drawing Sheets

METHOD AND APPARATUS FOR THE CONTROL AND REGULATION OF A FIRST MAGNITUDE OF A DEVICE BY ACTION ON A SECOND MAGNITUDE

BACKGROUND OF THE INVENTION

The invention relates to methods and devices designed for the control, by means of a first magnitude y, of a second magnitude x, said second magnitude itself being, for each of the values of the magnitude x, a known function of a parameter h which is not under control. In the method, it is assumed that the magnitude y is a one-to-one function of x:$y=f(x)$ and that, for each of the values of the magnitude x such as $x_p$, $x_p$ is a one-to-one function of a parameter h such that: $(x_p)=f_p(h)$. It also follows therefrom that, for a value of $x_p$, y is a function of h, $y_p=g_p(h)$.

The method and the device according to the invention can be applied whenever a point with an abscissa value h of the curve representing a second value $y_2(h)$ can be deduced from the point with the same abscissa value h of the curve representing a first value $y_1(h)$ by the addition of a value that is a linear function of h. The invention can be extended to an initial control value Y which is a one-to-one function of the magnitude y, controlling a value X which is a one-to-one function of the magnitude x. The functions $Y_{(y)}$, $X_{(x)}$ and $Y_{(X)}$ are not necessarily linear.

The invention relates especially but not exclusively to a voltage control designed for the current bias of a diode with intrinsic zone. In this application, the first magnitude y is a control voltage U, the controlled value x is the bias current I of the diode with intrinsic zone and the parameter h influencing the value of the current is the temperature T of the diode. The need to achieve strict control over the value of the forward bias current I of a PIN or NIP diode with intrinsic zone is encountered whenever it is sought, in a circuit, to control the value of the resistance R of this diode and especially whenever the diode has a controllable attenuator function.

The prior art embodiments cannot be used to obtain control of the bias current I of the diode with intrinsic zone that is well regulated in terms of temperature and has very short switching times between two control values. In the prior art embodiments, either the control is well regulated in terms of temperature, in which case however the switching times are long, or else the temperature regulation is inefficient.

SUMMARY OF THE INVENTION

The aim of the present invention, therefore, is to enable the swift control of a magnitude x by means of a magnitude y, and the efficient regulation of this magnitude x which, for each of its values $x_p$, is a known function $f_p(h)$ of a parameter h, which implies that, for each value $x_p$, the magnitude y is a function $y_p=g_p(h)$, when the different functions $g_p(h)$ have the property by which the value of a second function $g'_p(h)$ can be deduced from the value of a first function $g_p(h)$ for the same value h by the addition of a constant term and of a term proportional to the difference between the real value of h, $h_r$, and a reference value $h_i$.

Another aim of the invention is to be able to provide this control and this regulation on a wide range of values of the magnitude x and on a wide range of variations of the parameter h.

Another aim of the invention is to enable this control between a minimum value $x_m$ and a maximum value $x_M$ with a large number of control steps.

To obtain the invention, the properties of operational amplifiers are used.

It is known that the output voltage of an operational amplifier is proportional to the difference of the voltages applied to each of its two input terminals. It is this property that shall be used in the method according to the invention. To this end, a voltage $U_i$ shall be applied to one of the input terminals, this voltage $U_i$ being equal to the voltage which would have to be applied, if the parameter h had a reference value $h_i$, to obtain the value $x_i$ that is to be obtained.

A zero value will be applied to the other input if the value of the parameter h is effectively equal to $h_i$. If not, this value applied to the input will be equal to a value that is a function of the difference between the real value of the parameter $h_r$ and the reference value h. The value applied to the other input will be equal to $H_{(hr-hi)}$, $H_{(hr-hi)}$ being the value of the correction to be applied to the voltage $U_i$ to obtain the value $x_i$ when h is equal not to $h_i$ but to $h_r$. To apply the method, therefore, the parameter h should be measured at the position where this parameter influences the magnitude x and the correction needed to take account of the real value $h_r$ of the parameter h should be created by computation or by any other means.

The method and the device according to the invention are particularly well suited when the changing of the control voltage $U_i$ results in a self-regulation as a function of the parameter h of a part of the means carrying out the correction $H_{(hr-hi)}$.

The invention therefore relates to a method for the control of a magnitude x between two values $x_m$ and $x_M$, by action on a control magnitude y with which the magnitude x is in a one-to-one relationship when the value of a parameter h to which the magnitude x is sensitive remains constant, the magnitude y having to vary between two values $y_m$ and $y_M$ to make the magnitude x vary from $x_m$ to $x_M$ when the parameter h has a reference value $h_i$, the magnitude x itself being, for each of the controlled values $x_p$, a one-to-one function of the parameter h, the parameter h being capable of varying in a predetermined interval including the reference value $h_i$, $h_m h_M$ so that, for each of the values $x_p$ of the magnitude x, it is possible to define a function $y_p=g_p(h)$, $y_p$ being the value to be given to the magnitude y to obtain the value $x_p$ when the parameter has the value h, the different functions $g_p(h)$ having the property wherein the value of a second function $g_p(h)$ may be deduced, for any value of h included in the interval $h_m h_M$, from the value of a first function $g_p(h)$ for the same value of the parameter h, by the addition of a known term as a function of the difference between the real measured value $h_r$ of the parameter h and the reference value $h_i$; a method wherein the magnitude x is represented by the output magnitude of an operational amplifier having two inputs, a first input and a second input, and wherein, to the first input, there is applied a voltage $U_i$ representing the control magnitude $y_i$ to be applied to obtain the output magnitude with the value $x_i$ when h has the reference value $h_i$, the voltage $U_i$ varying from $U_m$ to $U_M$ when $x_i$ varies from $x_m$ to $x_M$; to the second input, there is applied a voltage $V_c$ which is the output magnitude corrected by a sensor of the parameter h, the output of the sensor being corrected, the corrected voltage $V_c$ being equal to 0 when $h=h_i$ and, if the opposite is the case, being equal to $H_{(hr-hi)}$, the function $H_{(hr-hi)}$ representing the value of the correction to be applied to the control magnitude $U_i$ to obtain the controlled value $x_i$ when the parameter h goes from the reference value $h_i$ to the measured value $h_r$.

A particularly simple embodiment of the invention is obtained when the laws of variation of y as a function of the parameter h are linear. In this case, the sensor of the magnitude h may be a linear sensor, the slope of the output magnitude of the sensor as a function of h being equal in value and having an opposite sign to one of the slopes of $y_p$ as a function of h.

The invention is also well suited to the case where the different functions $U_p(h)$ are any functions but can be deduced from one another by linear transformation.

In both these cases, since $h_i$ designates a value of the interval $h_m h_M$, a point with an abscissa value h of a second curve representing $y_p$ is deduced from the point with the same abscissa value h of a first curve representing $y_p$ as a function of h by the addition of a constant term and of a term proportional to the difference $(h-h_i)$. The coefficient of proportionality, when the curves are straight lines, is the ratio of the slopes of the second straight line and the first straight line.

Preferably, the reference value $h_i$ is chosen in the middle of the range of variation such that:

$$h_i = \frac{h_m + h_M}{2}$$

Preferably, the reference function $y_{pr}=g_{pr}(h)$ from which the other functions $g_{p(h)}$ are deduced is chosen so that it corresponds to the function for which the controlled magnitude xp is located at the center of the range of variation of the magnitude x, this value $x_{pr}$ being equal to:

$$x_{pr} = \frac{x_m + x_M}{2}$$

In the particularly simple example, where the laws of variation of y as a function of the parameter h are linear, the correction voltage can be applied by means of an operational amplifier, the gain of which is made proportional to the slope of the straight line representing the magnitude $y_p$ as a function of the parameter h, when the controlled magnitude x has the value $x_p$. The variation in gain is obtained by changing the value of a resistor placed in a feedback circuit of the amplifier.

If necessary, the correction voltage is the sum of two voltages, a so-called large-step voltage obtained by division of the total variation $y_M$-$y_m$ by the number u of large steps and a so-called fine-step voltage obtained by the division of the value of a large step, that is:

$$\frac{y_M - y_m}{u}$$

by the number v of fine steps, that is $$\frac{y_M - y_m}{uv}$$

The method and the device according to the invention shall be described here below in the case of an application to the current control of a PIN diode.

BRIEF DESCRIPTION OF THE DRAWINGS

A general embodiment, a particular exemplary embodiment of the method and a device designed to apply the method for this particular exemplary embodiment shall be described hereinafter with reference to the appended drawings, of which.

MORE DETAILED DESCRIPTION

The following particular example of the application of the invention relates to the control of a bias current of a PIN diode.

Figure 1:
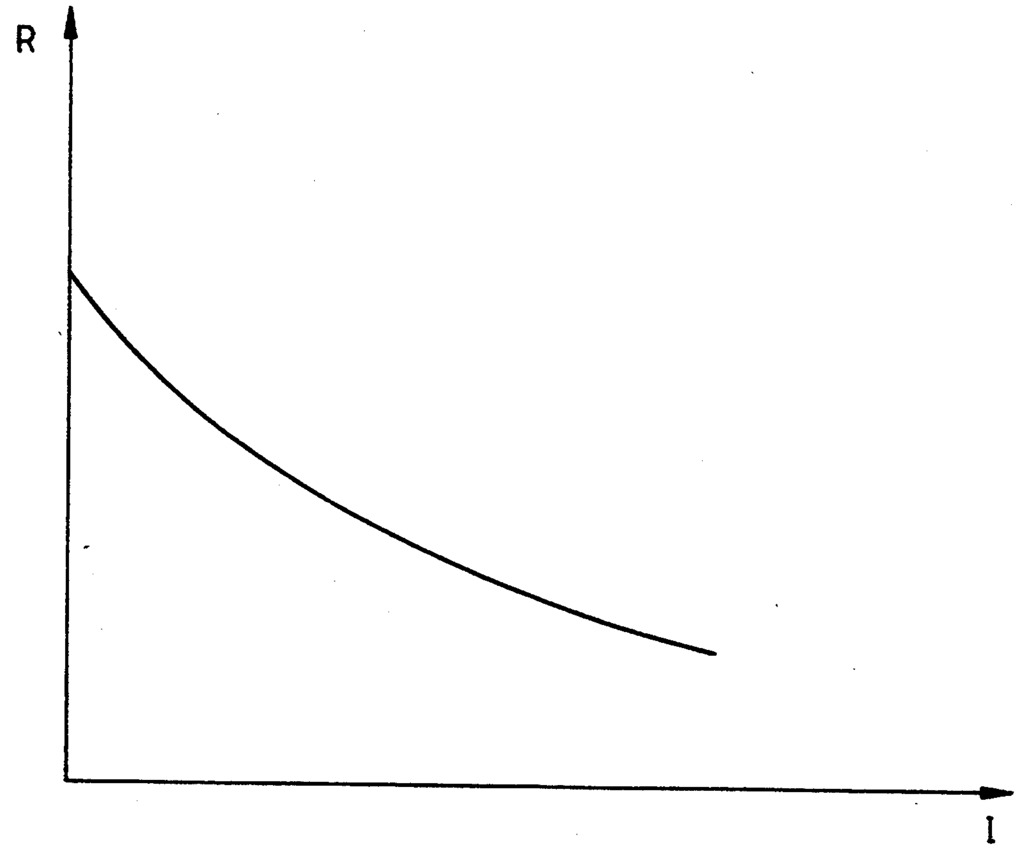
FIG. 1 shows the variation of the resistance R of a NIP or PIN diode with intrinsic zone when it is forward biased by a current I.

As explained further above, it is known that the resistance of the diode is determined by the intensity I of the bias current. The curve representing the value of R as a function of I is shown in FIG. 1.

This curve shows that R is a one-to-one function of I, the control of I leading to the control of R. In this exemplary embodiment, the control magnitude "y" will be represented by the voltage U which should be applied to the input of an operational amplifier to obtain the value x represented herein by the bias current of a diode connected to the output of the amplifier.

The parameter h is represented by the temperature T of the diode. It is known that, when the temperature T of a PIN diode increases, the bias voltage to be applied to the diode to obtain a constant output current I diminishes.

Figure 2:
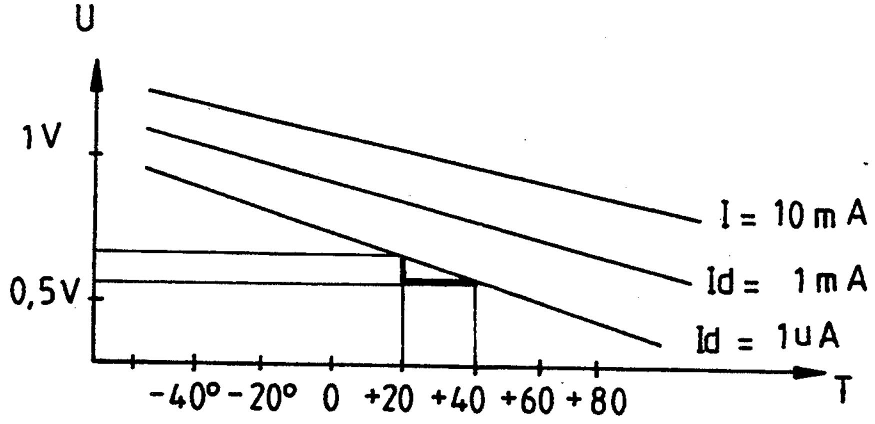
FIG. 2 shows the value of the voltage U to be applied to a diode having a constant output current when the temperature varies for different values of current.

The curves representing the voltage U which must be applied to the input of the amplifier to obtain a constant current when the temperature T varies are shown in FIG. 2 for values of I equal to 1 uA, 1 mA and 10 mA.

These are straight lines having different slopes.

Figure 3:
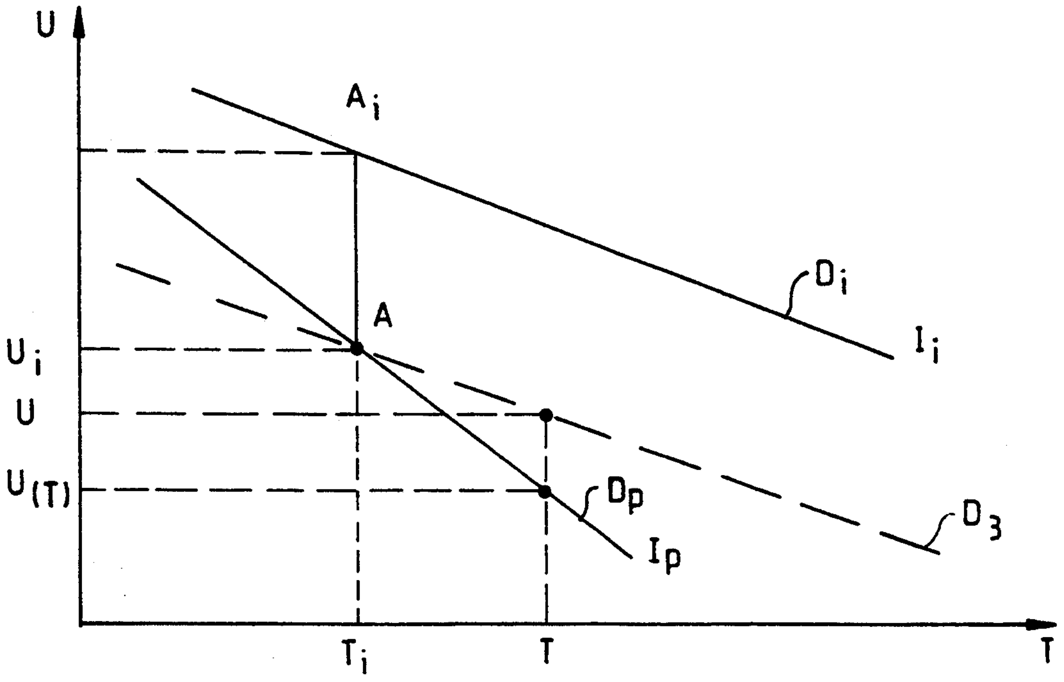
FIG. 3 shows an enlargement, given for explanatory reasons, of curves of FIG. 2.

Two of these straight lines have been shown in FIG. 3: one of these straight lines $D_p$ represents the value of U as a function of T when the bias current is $I_p$, the second straight line $D_i$ represents the value of U when the bias current is $I_i (I_i > I_p)$.

It is seen in this figure that the straight line $D_i$ can be deduced from the straight line $D_p$ as follows.

Let $D_3$ be the straight line passing through the point A, with coordinates $T_i$ and $U_i$, of the straight line $D_p$, this line $D_3$ being parallel to the straight line $D_i$. A point of the straight line $D_i$ is deduced from a point of the straight line $D_3$ thus built by the addition, to the value of U represented by the straight line $D_3$ for a value of T, of a constant value equal to $AA_i$, $A_i$ being the point of the straight line $D_i$ corresponding to the abscissa value $T_i$.

The straight line $D_3$ thus built is deduced from the straight line $D_p$ by the addition, to the value $U_T$ given by the straight line $D_p$ for an abscissa value T, of a magnitude $(U-U_T)$ proportional to the difference between T and $T_i$, the coefficient of proportionality being, in this case, equal to the ratio of the slopes of the straight lines $D_i$ and $D_p$.

The result thereof is that the straight line $D_i$ representing U as a function of T when I has the value $I_i$ is deduced from the straight line $D_p$ representing the value of U when I has the value $I_p$, plus a constant additive which herein is A $A_i$, by the addition, to the ordinate value $U_{(T)}$ obtained on the straight line $D_p$ for the value T, of a magnitude $K_{ip}(T-T_i)$, the coefficient of proportionality $K_{ip}$ being, in this case, equal to the ratio of the slopes of the straight lines $D_i$ and $D_p$.

It follows that a point of a second straight line representing U as a function of T for a constant value I is truly deduced from a point with an abscissa value T of a first straight line by the addition, to the ordinate value of the point with an abscissa value T of a first straight line, of a constant term, in this case $AA_i$, and of a term proportional to the value of the abscissa difference $(T-T_i)$, $T_i$ designating a value ranging between the minimum temperature $T_m$ and the maximum temperature $T_M$.

Figure 4:
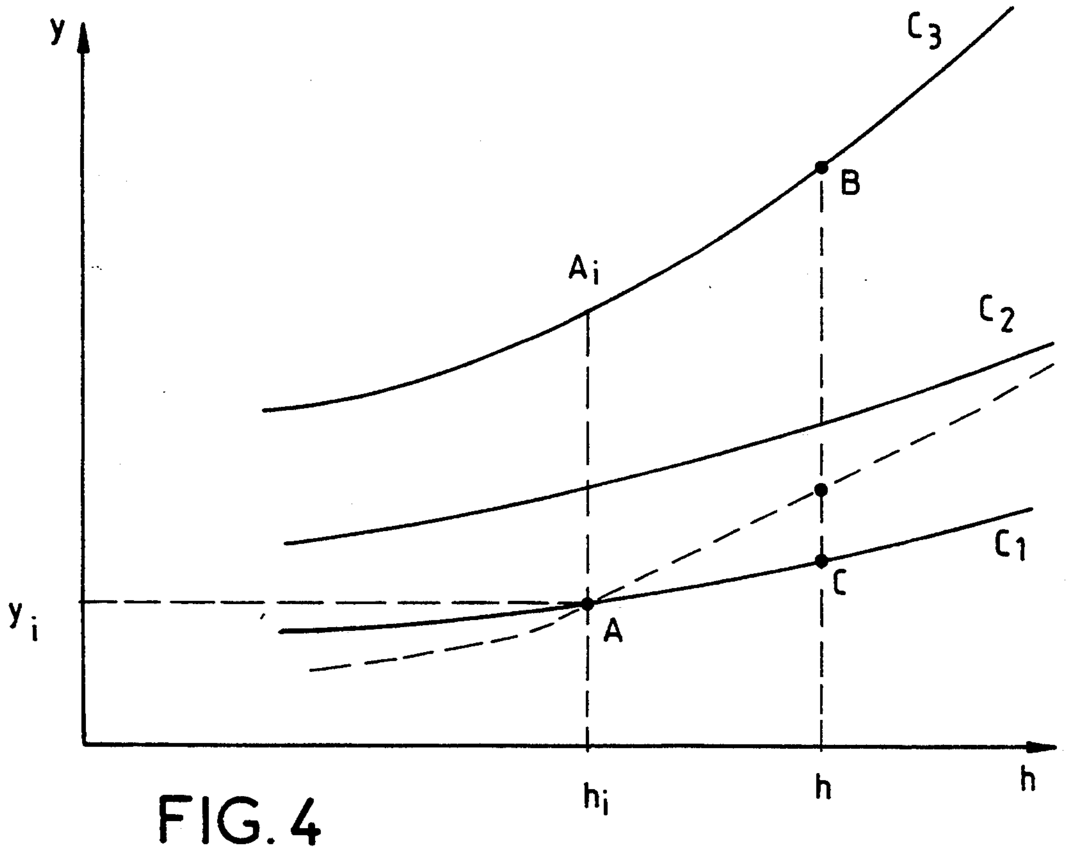
FIG. 4 shows curves of values that should be assumed by a control magnitude y to keep a controlled magnitude x constant when a parameter h, to which the magnitude x is sensitive, varies.

The different curves are not necessarily straight lines: thus FIG. 4 shows a set of three curves $C_1$, $C_2$, $C_3$, each of the curves representing the value to be given to the magnitude y to keep the magnitude x constant when the parameter h varies.

This figure also shows a point A on the curve $C_1$ having coordinates $h_i y_i$, and a point $A_i$ on the curve $C_3$ having an abscissa value $h_i$. The method is applicable if any point B of the curve $C_3$ having an abscissa value h is deduced from the point C (with an abscissa value h) of the curve $C_1$ by the addition, to the ordinate value of C, of the value A $A_i$ and of a term proportional to $y_{(h-hi)}$, the coefficient of proportionality being the same for all the points C and B of the curves $C_1$ and $C_3$ or of the curves $C_1$, $C_3$, obtained by a first transformation of $C_1$ and $C_3$.

Figure 5:
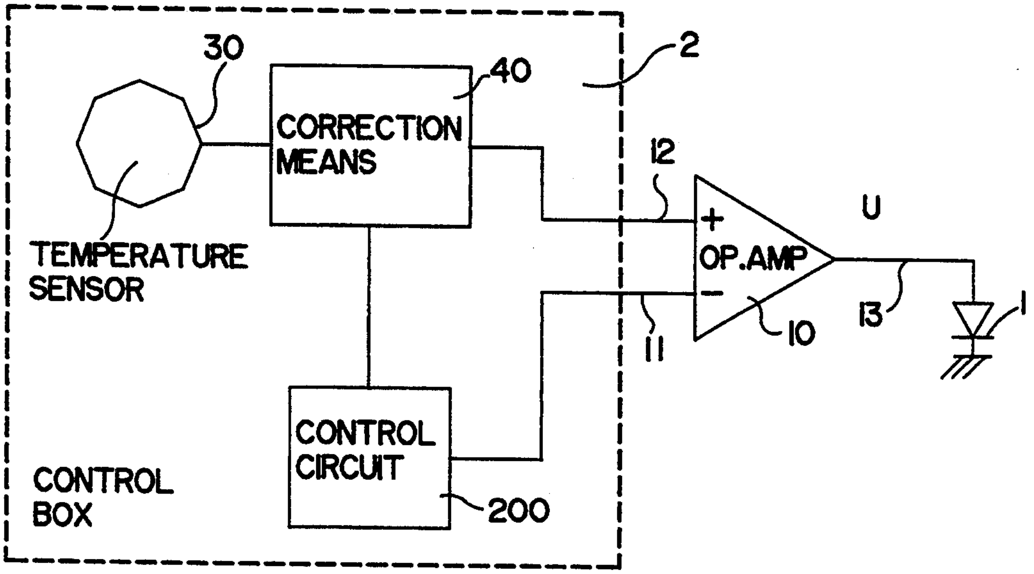
FIG. 5 shows a diagram of the invention in its most general form.
Figure 6:
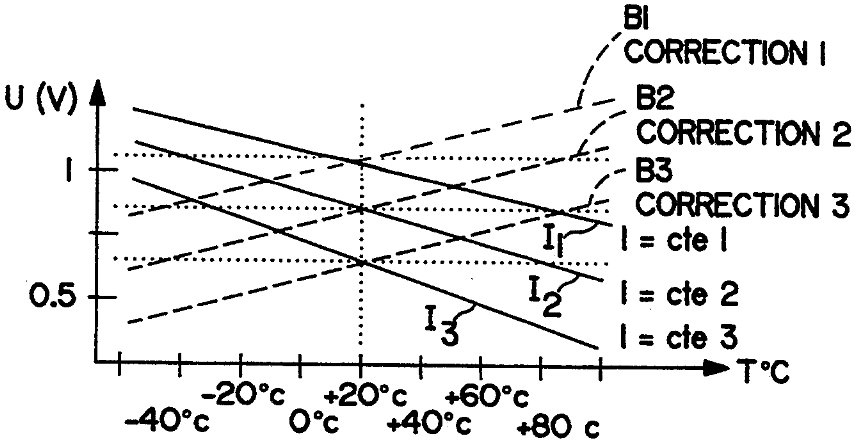
FIG. 6 shows straight lines known as straight lines for the correction of the value of the control voltage as a function of the parameter h.

A device that can be used to implement the invention in its most general form shall now be described with reference to FIG. 5.

This figure shows a PIN diode 1 for which it is sought to control its resistance R, hence its current, by means of a control voltage U. The command and control device is constituted by a means 2. This means applies the control voltage U in the following way to the input of an operational amplifier 10 with high internal resistance having two inputs, namely a first input 11 and a second input 12, and one output 13. From a control circuit 200, the input 11 of this amplifier receives a voltage $U_i$ which would be the voltage to be applied to obtain a value $I_i$ of the controlled current if the temperature of the diode had the reference value $T_i$.

The input 12 of this amplifier is supplied by the output of a temperature sensor 30, this output being corrected by a means 40 which receives the value of the command coming from the control circuit 200. The sensor 30 is preferably located close to the PIN diode 1 so that the temperature which it senses is as close as possible to that of the diode.

As explained further above, the method and the device according to the invention are particularly promising when the device for correcting the voltage delivered by the sensor 30 is self-regulated. It has been seen further above that when the functions $y_{(p)}=g_p(h)$ can be deduced from each other by linear transformation, it is possible to obtain this result by using an operational amplifier. The curves representing U for I constant are straight lines (Cf. FIG. 2). The corrections to be applied are shown in FIG. 3 in dotted lines.

In this figure, the reference value $T_i$ is equal to 20°, namely the central value of the range −40° to 80°.

The correction 1 straight line $B_1$ has a slope opposite to the straight line $I_1$ representing U as a function of T for I equal to a first constant 1. This is also true for the correction 2 and 3 straight lines $B_2$ $B_3$ and the straight lines $I_2$ and $I_3$, I=constant 2, I=constant 3.

The correction straight line $B_1$ intersects the straight line $I_1$ at a point with an abscissa value $T_i$=20° C. This is also true for the correction straight lines 2 and 3 and the straight lines I=constant 2 and I=constant 3. This means that, for T=20° C., the value to be applied to the input 12 is equal to 0.

When T is different from 20° C., it is necessary to apply a correction which, for example, if I=constant 1 is the desired value, should be proportional to the difference in ordinate values between the straight line I=constant 1 and the correction 1 straight line $B_1$ for the abscissa value T considered.

Figure 7:
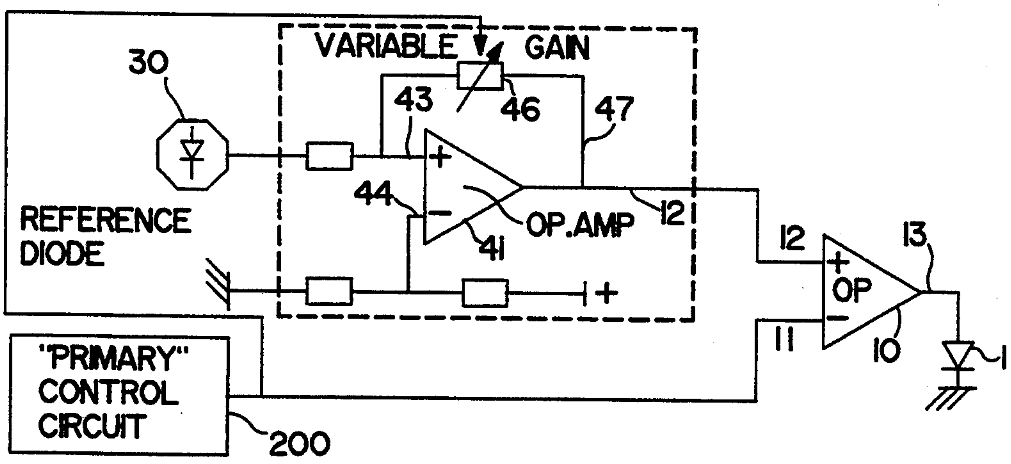
FIG. 7 shows the embodiment of the invention when the functions $y_p=g_p(h)$ are linear.

It has been seen that it is possible to make a device using an operational amplifier. A device such as this is shown in FIG. 7. This figure is identical to that of FIG. 5, but the device 40 has been shown in detail. It has an operational amplifier 41 comprising an output 12 and two inputs 43, 44. A feedback loop 47 brings the output voltage back towards the input 43 by means of a variable resistor 46. The input 43 also receives the output voltage from the sensor 30. The variable resistor 46 is controlled by the control circuit 200. The value of the resistor 46 is such that the gain of the operational amplifier 41 is proportional to the value of the slope of the correction straight line used for the value controlled. The operation is as follows:

When $T=T_i$, the output voltage of the amplifier 41 is zero. It then varies proportionally to the difference between T and $T_i$, the value of the slope of the variation being fixed by the value of the gain of the operational amplifier which is itself controlled by the value displayed for the current I by the control circuit 200.

The output 12 of the operational amplifier 41 is the second input of the operational amplifier 10.

The control circuit 200 which controls the value of the voltage at the input of the amplifier 10 and the value of the resistor 46 placed in the feedback loop 47 has two parts 210 and 220 to carry out each of these functions.

An embodiment of the part 210 of the control circuit 200 connected to the input 11 shall now be described with reference to FIG. 8.

In this embodiment, the arrival of a command takes place in decibels, namely in terms of logarithmic value. A first linearization would therefore be necessary to return to a value in terms of linear attenuation. The desired attenuation is a linear function of the value of the resistance introduced to achieve the attenuation. The resistance introduced is the resistance of the PIN diode 1, for which the curve of variation as a function of I is shown in FIG. 1.

Since this curve is not a straight line, it would be necessary to introduce a second linearization transformation so that the means 40 truly works linearly as indicated further above with reference to the description of FIG. 7. These two linearizations are introduced into a single linearization. Finally, in this embodiment, given the desired precision, a very fine step was needed. This is obtained by splitting up the control voltage into two steps, a large step and a fine step, the two voltages being added.

The part 210 of the control circuit 200 is set up as follows. The input command 201 encoded on 6 parallel bits 201*a* to 201*f* is given with a clock signal. This command therefore makes it possible to obtain $2^6$ (namely 64) attenuation steps distributed herein between 0 and 64 decibels in one-decibel steps.

These signals are set to TTL standards at 0.5 V by a D type flip-flop controlled by the clock signal.

The output binary word 203 from the flip-flop 202 which represents the input value at the TTL standards addresses two parallel circuits. One of these circuits, having simple reference numbers, represents the large-step command while the other, having the same reference numbers but with an added prime mark ('), represents the fine-step command. The operation of the large-step command shall now be described. The binary word 203 at output of the flip-flop 202 addresses a programmable memory 204, the compartments of which enable the storage of eight bits. The values stored in the memories enable the performance of a transposition to carry out the above-mentioned linearization. It can be seen that, owing to the linearization, the width of the steps at output of the memory is variable and that there may possibly be a need for very fine steps which can be achieved only by a coding operation on a larger number of bits.

It will also be understood that a method of transposition such as this can be used to linearize the relationships of two magnitudes in one-to-one correspondence with each other.

The output information elements of the addressed compartment of the memory 204 are resynchronized by a D type flip-flop 205 and sent to an analog-digital converter (ADC) 206. This ADC 206 behaves like a resistor, the value of which changes as a function of the input values received.

The fine-step control comprises the same elements having the same functions, namely a set of memory compartments 204', a flip-flop 205' and a digital-analog converter 206'. The two resistors constituted by the two converters 206 and 206' are parallel connected between a reference voltage generator (not shown) and the input 207 of an operational amplifier 208.

The output 11 of this amplifier is the input of the adder amplifier 10 of FIG. 7.

Figure 9:
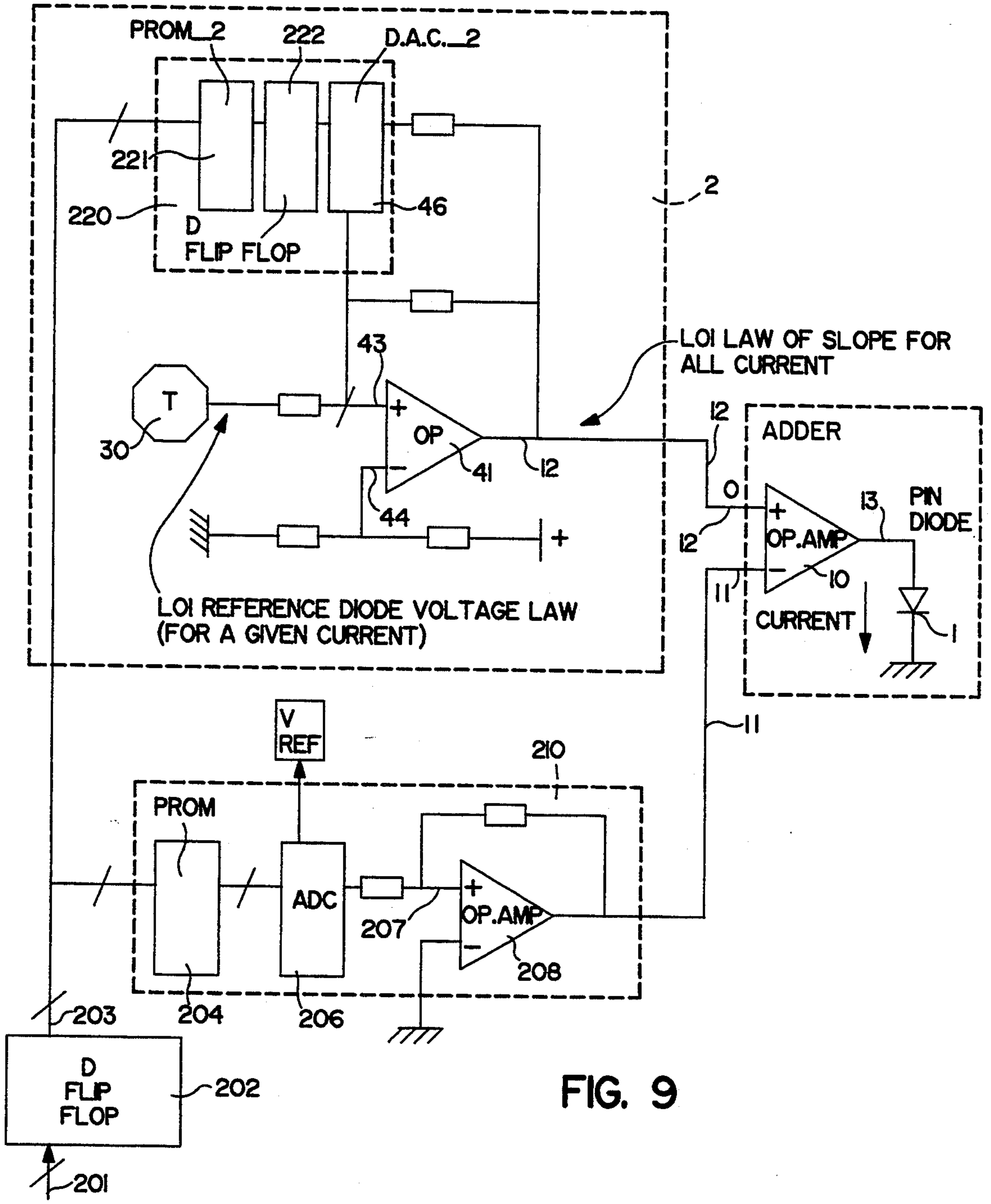
FIG. 9 shows the general block diagram of the particular embodiment.

The rest 220 of the control circuit 200 shall now be described with reference to FIG. 9 which shows a simplified diagram giving a synoptic view of the control and regulation set.

Figure 8:
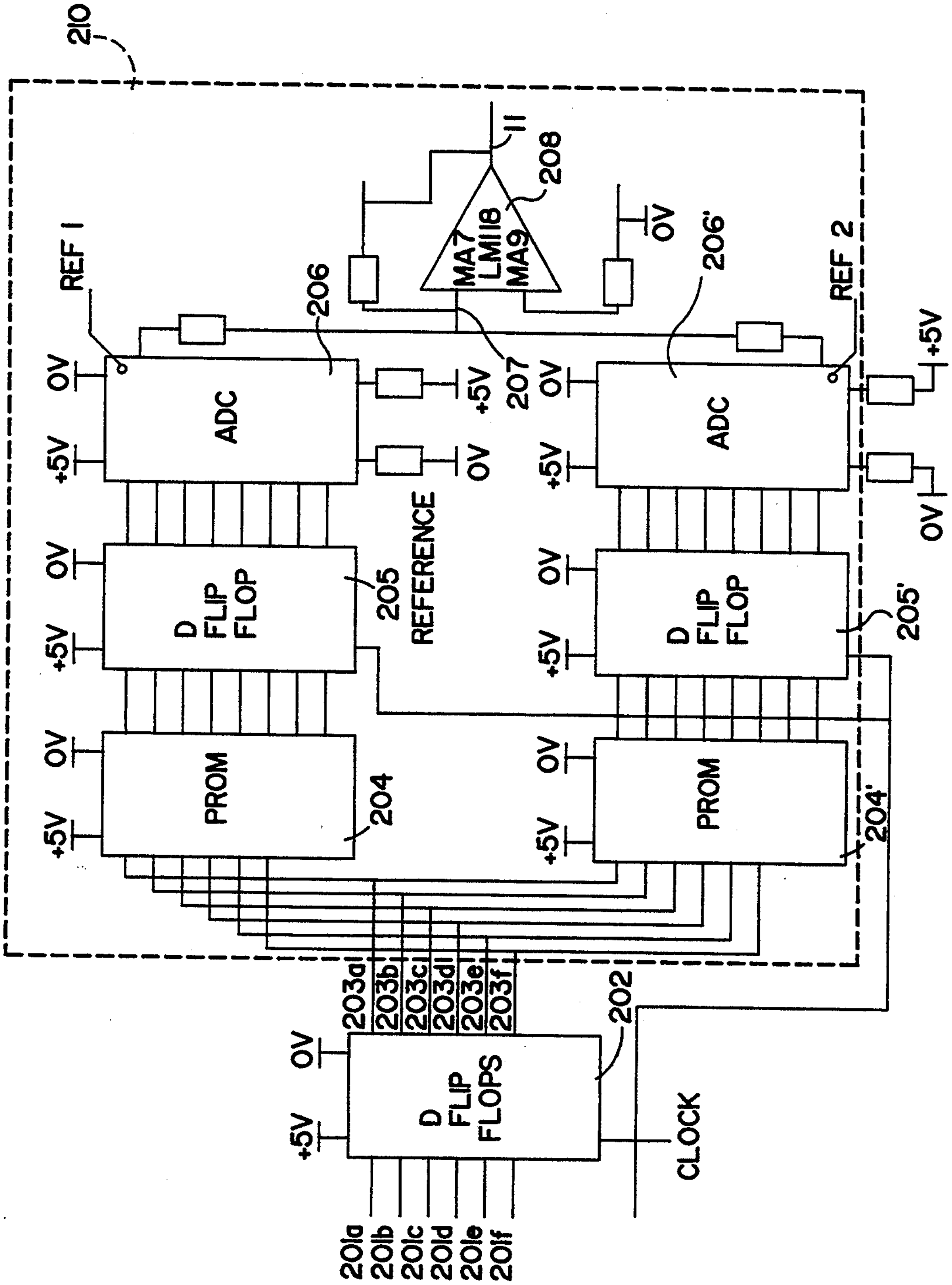
FIG. 8 shows a way of achieving the invention when the magnitude y is itself controlled by a magnitude Y and when the finally controlled magnitude is not the magnitude x but a magnitude X which is a one-to-one function of x.

This figure shows that the attenuation control word 203 coming from the flip-flop 202 is sent not only towards the transformation device represented in FIG. 8 by memories 204, flip-flops 205 (not shown in FIG. 9) and converters 206 but also towards a similar device 220 having an identical function constituted by a memory group 221, a flip-flop 222 and a digital-analog converter 46 which acts as a variable resistor as explained in the description of FIG. 7. The values displayed in the memories addressed by the control word 203 reproduce the image of a curve plotted during preliminary tests on a PIN diode 1 mounted under the same conditions. They represent the values of the resistors 206 and 46 respectively that are to be displayed in order to obtain the attenuation that is commanded.

The memories can be programmed manually by means of coding wheels taking the place of memories. The attenuations, decibel by decibel up to 64, and the corresponding word on each of the coding wheels are recorded in a table for $T=T_i$. These information elements are then entered by means of a keyboard of a programmer for each of the memories.

The programming of the memories can also be computerized.

The output voltage of the temperature sensor 30 constitutes the reference voltage supplying the converter 46 and the input 43 of the operational amplifier 41. It is made from a bare sensor and is matched, for example, by means of an operational amplifier so that its output voltage is equal to the supply voltage of the input 44 of the operational amplifier 41 when the temperature is equal to the reference temperature $T_i$.

In the case of the embodiment, the matching is particularly simple for the curves U as a function of T are straight lines and there are sensors in the market giving a linear voltage as a function of the temperature. This is why it is possible, in this case, to be satisfied with a matching by operational amplifier. In the more general case where the curves of variation of the magnitude y as a function of h are any curves but can be deduced from each other by linear transformation, the matching may include a memory/converter association to set up a corrected sensor output having the form of one of the functions $y_p(h)$.

It is thus seen that, in this embodiment, the input magnitude Y which, herein, is an attenuation in decibels, controls a value y which herein is the value of the voltage U applied to the input of the operational amplifier 10 which itself conditions the value of the magnitude x which, herein, is the value of the output current I of the amplifier 10 which itself conditions a magnitude X which is the value of the resistance of the PIN diode 1.

Figure 10:
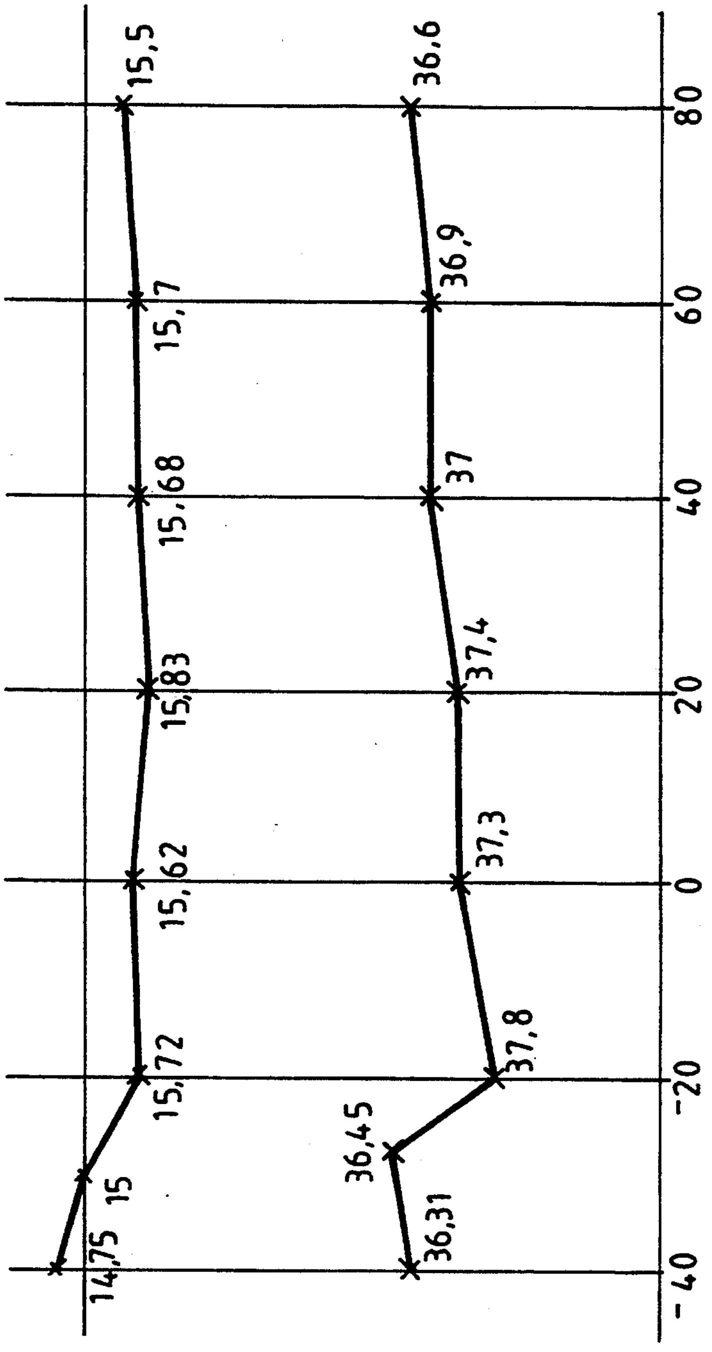
FIG. 10 shows the results obtained.

The attenuation obtained is almost constant when the temperature T varies from −20° to +80° The values obtained for 16 dB and 37 dB commands are shown in FIG. 10.

The switching time between two commands is of the order of 200 nanoseconds.

What is claimed is:

1. A method for the control of a magnitude x between two values, $x_m$ and $x_M$, by action on a control magnitude y with which said magnitude x is in a one-to-one relationship when a parameter h, to which the magnitude x is sensitive remains constant, wherein said magnitude y varies between two values $y_m$ and $y_M$ causing said magnitude x to vary from $x_m$ to $x_M$ when the parameter h has a reference value $h_i$, said magnitude x is a one-to-one function of the parameter h, for each control value $x_p$ the parameter h varies in a determined interval $h_m$ to $h_M$, including said reference value $h_i$, and for each value of $x_p(h)$ a function $y_p=g_p(h)$ is defined where $y_p$ is a value given to said magnitude y to obtain the value $x_p$ when said parameter has a value of h, a second function $g'_p(h)$ can be determined from different values of $g_p(h)$, with h being a value in said interval $h_m$ to $h_M$, from a value of a first function $g_p(h)$ for the same value of the parameter h, by addition of a function of the difference between the real measured value $h_r$ of the parameter h and the reference value $h_i$; said method comprising, representing said magnitude x by the output magnitude of a first operational amplifier having first and second inputs, applying to said first input a voltage $U_i$ representing control magnitude $y_i$ to obtain said output magnitude having a value $x_i$ when said parameter h has a reference value $h_i$, varying said voltage $U_i$ from $U_m$ to $U_M$ when x varies from $x_m$ to $x_M$, applying to said second input a voltage $V_c$ which represents the output magnitude corrected by a sensor of the parameter h, wherein said corrected voltage $V_c$ is substantially equal to 0 when $h=h_i$ and substantially equal to $H_{(hr-hi)}$ when $h\neq h_i$, and applying a correction to said control magnitude $U_i$ to obtain a control value $x_i$ when the parameter h goes from said reference value $h_i$ to a measured value $h_r$, wherein said correction is represented by function $H_{(hr-hi)}$.

2. A method according to claim 1, further comprising, determining the functions $y_p=g_p(h)$ from each other by linear transformations, and said sensor reproducing one of said functions $y_p=g_p(h)$.

3. A method according to claim 1, wherein said reference value $h_i$ is centered in a range of variation of said parameter h.

4. A method according to claim 1, wherein said magnitude y is a one-to-one function of another control magnitude Y and further comprising magnitude x acting directly on another magnitude X which is preferably controlled by magnitude Y, Y and X being in a one-to-one relationship under these conditions, and the magnitude Y undergoing a transformation for each value of the magnitude Y creating a corresponding value y which gives a desired value to the magnitude X.

5. A method according to claim 1, wherein said functions $y_p=g_p(h)$ are linear functions of h defined by slopes $a_p$ and said sensor output is a linear voltage as a function of h, and further comprising, a second operational amplifier having first and second inputs outputting said correction voltage $V_c$ applied to said second input of the first operational amplifier, said second operational amplifier receiving a reference voltage at said first input and said output voltage from said sensor at said second input, and magnitude y acting on a resistor placed between said output and said second input of said second operational amplifier forcing said first operational amplifier to have a gain proportional to $a_p$.

6. A method according to claim 1, further comprising creating said functions $g_p(h)$ from reference function $y_{pr}=g_{pr}(h)$ thereby giving the magnitude x its mean value:

$$\frac{x_m + x_M}{2}$$

7. A device for the control of a magnitude x between two values, $x_m$ and $x_M$, by action on a control magnitude y with which said magnitude x is in a one-to-one relationship when a parameter h, to which said magnitude x is sensitive, remain constant, wherein said magnitude y varies between two values $y_m$ and $y_M$ to make said magnitude $x_m$ vary from $x_m$ to $x_m$ when the parameter h has a reference value $h_i$, said magnitude x is a one-to-one function of said parameter h for each control value $x_p$, the parameter h varying in a predetermined interval $h_m$ to $h_M$, including reference value $h_i$, so that, for each value $x_p(h)$ of said magnitude x, a function $y_p=g_p(h)$ is defined, wherein $y_p$ is a value given to said magnitude y to obtain the value $x_p$ when said parameter has a value of h, a second function $g_p(h)$ can be determined by the different functions $g_p(h)$ with h being any value in said interval $h_m$ to $h_M$, from a value of a first function $g_p(h)$ for the same value of the parameter h, and the addition of a known term as a function of the difference between the real measured value $h_r$ of the parameter h and the reference value $h_i$; said device comprising a first operational amplifier having first and second inputs and an output representative of said magnitude x, a control circuit for applying a voltage $U_i$ to said first input wherein, said voltage $U_i$ represents a control magnitude $y_i$ to obtain said output magnitude with a value $x_i$ when parameter h has a reference value of $h_i$, and said voltage $U_i$ varying from $U_m$ to $U_M$ when $x_i$ varies from $x_m$ to $x_M$, a sensor of parameter h, and a correction means for correcting the output of said sensor and outputting a voltage $V_c$ to said second input of operational amplifier, the corrected voltage $V_c$ is substantially equal to 0 when $h=h_i$ and substantially equal to $H_{(hr-hi)}$ when $h\neq h_i$, and the value of the correction to be applied to the control magnitude $U_i$ to obtain the controlled value $x_i$ when the parameter h goes from the reference value $h_i$ to the measured value $h_r$ is represented by $H_{(hr-hi)}$.

8. A device according to claim 7, wherein said control circuit comprises a first control circuit for controlling the voltage $U_i$ applied to the input of the first operational amplifier and a second control circuit for controlling the correction device.

9. A device according to claim 8, wherein said functions $y_p=g_p(h)$ are linear functions of h defined by their slopes $a_p$, said sensor is a linear sensor and said correction device further comprises a second operational amplifier having first and second inputs and one output, the first input receiving a reference voltage and the second input receiving said output voltage from said linear sensor, a gain proportional to $a_p$, and a resistor in a feedback loop between said output and said second input, the value of the resistor being controlled by said second control circuit.

10. A device according to claim 8, wherein said first control circuit further comprises, a first D flip flop having an input and an output, the input receiving a control word, a memory connected to said output of said first flip flop, an analog-digital converter connected to and controlled by said memory and comprising a variable resistor, and a third operational amplifier having an input connected to said variable resistor and an output comprising one of said outputs of said first operational amplifier.

11. A device according to claim 10, wherein a second D flip flop is interposed between the memory and the converter.

12. A device according to claim 8, wherein said first control circuit comprises, a first D flip flop having an input and an output, the input receiving a control word and the output addressing two parallel lines, said first line constituting a large-step control and said second line constituting a fine-step control, each parallel line comprises a memory addressed by said control word at the output of the D flip flop, an analog-digital converted controlled by said memory and constituting a variable resistor connected to one input of a third operational amplifier, the output of which constitutes one of the outputs of the first operational amplifier.

13. A device according to claim 12, further comprising a second D flip flop interposed between said memory and said converter of said first line and a third D flip flop interposed between said memory and said converter of said second line.

14. A device according to claim 9, said second control circuit further comprising a memory addressed by a control word, and a digital-analog converter constituted by a resistor and controlled by the value contained in the addressed memory.

15. A device according to claim 14, wherein a second D flip flop is interposed between the memory and the converter.

16. An apparatus for the control and regulation of a first magnitude of a device by action of a second magnitude, comprising said first magnitude having a one-to-one relationship with said second magnitude when a parameter of the device remains constant, said second magnitude varies between two values which causes said first magnitude to vary between two values when said parameter is a reference value, said first magnitude is a one-to-one function of said parameter, said parameter varies in an interval which includes the reference value, a first operational amplifier having first and second inputs, a control circuit connected to said first input of said operational amplifier for supplying a control voltage, a sensor to sense said parameter, a correction means for correcting said parameter having a plurality of inputs and an output, a first input connected to said sensor for receiving said parameter and a second input connected to said control circuit for receiving a command word, the output of said correction means being connected to said second input of said first operational amplifier for supplying a corrected voltage.

17. The apparatus of claim 16, wherein said corrected voltage is substantially equal to zero when said parameter substantially equals said reference value and substantially equals the value of correction applied to said second magnitude to obtain a controlled first magnitude when said parameter goes from said reference value to a measured value.

18. The apparatus according to claim 17, wherein said control circuit further comprises first control circuit for controlling said control voltage and second control circuit for controlling said correction device.

19. The apparatus of claim 18, wherein said sensor is a linear sensor and said correction device further comprises, a second amplifier having first and second inputs and an output, said first input for receiving a reference voltage, said second input for receiving said output voltage from said linear sensor, said second amplifier having a gain proportional to slopes of linear functions of said second magnitude, and a resistor in a feedback loop between said output and said second input of said second operational amplifier.

20. The apparatus of claim 19, further comprising said resistor having a value controlled by said second control circuit.

21. The apparatus of claim 18, wherein said first control circuit further comprises, a first D flip-flop having an input for receiving a control word and an output connected to a memory, an analog digital converter connected to and controlled by said memory, and a third operational amplifier having an input connected to said converter and an output connected to said first input of said first operational amplifier.

22. The apparatus of claim 21, wherein said converter is a variable resistor.

23. The apparatus of claim 21, further comprising a second D flip-flop interposed between said memory and said converter.

24. The apparatus of claim 18, wherein said first control circuit further comprises, a first flip-flop having an input for receiving a control word and an output for addressing first and second parallel lines, said first line comprising a first memory addressed by said control word and first analog-digital converter controlled by said first memory, said second line comprising a second memory addressed by said control word and a second analog-digital converter controlled by said second memory, and a third operational amplifier having inputs connected to said first analog-digital converter and said second analog-digital converter and an output connected to said first input of said first operational amplifier.

25. The apparatus of claim 24, wherein said first line is a large-step control and said second line is a fine-step control and said first and second analog-digital converters are variable resistors.

26. The apparatus of claim 25, further comprising, a second D flip-flop interposed between said first memory and said first converter, and a third D flip-flop interposed between said second memory and said second converter.

27. The apparatus of claim 19, wherein said second control circuit further comprises, a memory addressed by a control word, and a digital-analog converter connected to and controlled by said memory.

28. The apparatus of claim 27, further comprising a second D flip-flop interposed between said memory and said converter.

29. The apparatus of claim 27, wherein said analog-digital converter is a resistor.

30. A method according to claim 5, further comprising creating said functions $g_p(h)$ from reference function $y_{pr}=g_{pr}(h)$ thereby giving the magnitude x its mean value:

$$\frac{x_m + x_M}{2}$$

* * * * *